US011970879B2

(12) United States Patent
Loreti

(10) Patent No.: US 11,970,879 B2
(45) Date of Patent: Apr. 30, 2024

(54) PROGRAMMABLE CYLINDER LOCK NOT REQUIRING A SPECIFIC CHANGE KEY

(71) Applicant: Schlage Lock Company LLC, Carmel, IN (US)

(72) Inventor: Alberto Loreti, Rome (IT)

(73) Assignee: Schlage Lock Company LLC, Carmel, IN (US)

( * ) Notice: Subject to any disclaimer, the term of this patent is extended or adjusted under 35 U.S.C. 154(b) by 388 days.

(21) Appl. No.: 17/336,706

(22) Filed: Jun. 2, 2021

(65) Prior Publication Data

US 2022/0282526 A1 Sep. 8, 2022

(30) Foreign Application Priority Data

Mar. 5, 2021 (IT) ........................ 102021000005276

(51) Int. Cl.
*E05B 27/00* (2006.01)

(52) U.S. Cl.
CPC ........ *E05B 27/005* (2013.01); *E05B 27/0017* (2013.01); *E05B 27/0039* (2013.01)

(58) Field of Classification Search
CPC .... E05B 27/00; E05B 27/005; E05B 27/0017; E05B 27/0039
USPC ........................................................... 70/384
See application file for complete search history.

(56) References Cited

U.S. PATENT DOCUMENTS 4,747,281 A * 5/1988 Monahan .............. E05B 27/005 70/385
2006/0101880 A1* 5/2006 Ward-Dolkas ........ E05B 29/004 70/383
2010/0050717 A1* 3/2010 Chiang ............... E05B 17/0062 70/377
2016/0265249 A1* 9/2016 Zhang ................... E05B 29/004

FOREIGN PATENT DOCUMENTS

EP 2529068 A1 12/2012
EP 2529068 B1 * 8/2013 ........... E05B 29/004

OTHER PUBLICATIONS

EP Search Report, IT Application 202100005276, dated Nov. 19, 2021 (7 pages).

* cited by examiner

*Primary Examiner* — Nathan Cumar
(74) *Attorney, Agent, or Firm* — Taft Stettinius & Hollister LLP

(57) ABSTRACT

A mechanically reprogrammable cylinder lock includes a magnetic tool to provide reprogramming.

7 Claims, 6 Drawing Sheets

PROGRAMMABLE CYLINDER LOCK NOT REQUIRING A SPECIFIC CHANGE KEY

CROSS-REFERENCE TO RELATED APPLICATIONS

This application claims priority to, and the benefit of, Italian application no. 102021000005276, filed Mar. 5, 2021, which is are hereby incorporated by reference in its entirety.

FIELD OF THE INVENTION

The present invention concerns a programmable cylinder lock, namely a lock comprising devices intended to allow, through a change operation, to modify the former lock codification in order to adapt the lock for being operated by a key different from the key to which the lock was formerly adapted More particularly, the invention concerns improvements in a kind of programmable cylinder lock which is known from the European Patents No 0.226.252 and 0.900.310 and no 2.529.068. The kind of locks to which applies the present invention is a lock with a programming device, which comprises a stator, a cavity provided in said stator, a rotor rotatably mounted in said stator cavity and a keyhole hollowed in said rotor, and wherein the programming device comprises in the stator a longitudinal groove made in said stator cavity and a series of stator seats, which in case can contain counter-pins and the respective springs, and comprises in the rotor:

a series of first seats intersecting said keyhole and a series of second seats parallel to said first seats;

a first slot and a second slot, orthogonal with respect to said seats and parallel to the rotor axis;

a series of key followers inserted with longitudinal and transversal mobility in said first rotor seats for cooperating with the conformations of a key inserted into said keyhole, each key follower having on one side some projections and on the other side an element for sliding engagement, and having an associated spring;

series of locking pins slidingly inserted in said second rotor seats corresponding to said stator seats and possible counter-pins and having a series of first recesses facing said projections of the key followers and a series of second recesses on the side opposite said key followers;

a stop bar inserted in said first rotor slot, having projections facing said second recesses of the locking pins, and a projection facing the side opposite said locking pins and suitable for cooperating with said stator groove for allowing an outward displacement of the stop bar;

first springs associated to said stop bar and biasing the same outwards;

a change bar, inserted in said second rotor slot, having slidable engagement elements engaged with said sliding engagement elements of the key followers, and having a projection facing the side opposite the key followers and suitable for cooperating with said stator groove for allowing an outward displacement of the change bar;

aid component parts being coordinated in such a way that said projections of the stop bar engage said second recesses of the locking pins when the projection of the stop bar does not correspond to said stator groove, and disengage therefrom when the stop bar corresponds to said stator groove, displaces outwards under action of said first springs and determines for the lock a position for insertion and retraction of the key, whereas said key followers engage said second recesses of the locking pins when the projection of the change bar does not correspond to said stator groove and disengage therefrom when said change bar corresponds to said stator groove, displaces outwards by dragging with them the key followers by action of the respective sliding engagement elements, and determines for the lock an angular position of key change in which said key followers are disengaged from said locking pins and allow replacing the key with consequent different programming of the lock. Therefore, the change bar automatically moves outwards, disengaging the key followers from the locking pins, every time the key is brought into the change position. However, it is necessary to avoid that the lock is inadvertently deprogrammed by removing the key when it is in the change position, even if the user does not intend to perform a new programming.

To this aim, according to document EP 0.900.310 there is provided, near the outer end of rotor, a fork ring engaging a recess of the key and preventing its extraction when the key is not in the position for insertion and extraction. In this case, the change of programming is possible only by using a special change key whose shape is such that it is not retained by the fork ring.

All this complicates the lock structure and involves complicated actions, difficulties and obstacles for the user who is intended to modify the lock programming. Moreover, because a special key is needed for effecting the change, it is not possible to arrange the lock for using normal keys available in commerce, a possibility which would be of great technical and commercial interest.

A general drawback of programmable locks consists in that, if the key intended to program the lock is inserted in an incomplete way, the lock receives a faulty programming which is then not easy to correct.

Document EP 2,529,068 describes a reprogrammable lock with an initial key, a change bar and a new key i.e. without the aforementioned special change key. In particular, the change bar is normally kept in a misaligned position with respect to the rotor axis by means of a spring arranged asymmetrically with respect to the midpoint of the bar itself. In this position, the change bar maintains the engagement between the key followers and the pins in the closest region to the opening for the introduction of the key. These key followers are therefore locked for movement in their respective first rotor seats and this is sufficient to prevent the retraction of the initial key. Only via the use of the change rod when the rotor is in the angular change position, the change bar retracts completely in the groove of the stator disengaging from the pins all the key followers which, having therefore become mobile in the first place, allow the extraction of the initial key and the subsequent insertion of the new key which will provide the new mapping of the lock. This mapping is mechanically stored when the user, by turning the new key angularly, rotates the change bar outside the stator groove. This causes the radial movement of the change bar towards the axis of rotor and the engagement of all the key followers, arranged according to the mapping of the new key, with their respective locking pins.

The present invention has the scope of improving the user experience of a lock as previously described since for some users the use of the change rod, which requires a certain precision and can therefore be complicated, for example in conditions of poor lighting.

The present invention has the general purpose of improving known locks of the type referred to, so as to remedy the drawbacks indicated.

In particular, the invention has the main purpose of achieving the desired programming operation with greater simplicity even in poor lighting conditions and, at the same time, allowing the use of keys normally available on the market without resorting to special keys e.g. the change key.

These objects are achieved by the fact that, in a mechanical reprogrammable lock provided with a reprogramming tool, the latter comprises a stop movable between an advanced position in which the programming insert is locked so that the key followers and locking pins are engaged and in a retracted position in which the programming insert is elastically pushed into the reprogramming position and wherein the stop comprises a magnetic material and also the tool is magnetic and of such polarity as to bring the stop into the retracted position when approached to the rotor.

In this way, it is possible to reprogram the lock in a particularly simple and intuitive way e.g. the magnetic tool must only be approached with no particular need to be inserted in a small seat. This makes the lock particularly suitable for uses in contexts that do not require specialized personnel such as, for example, domestic locks. It is also possible to apply a series of variants e.g. depending on the configuration, the force applied by the tool on the insert can be attractive or repulsive.

According to a preferred embodiment, the programming insert is movable in the radial direction in the rotor to couple/uncouple the toothed locking pins and key followers; and the stop is movable in the axial direction between the extracted and retracted position. In this way, the force applied to disengage the stop from the programming insert is independent of the force required to move the programming insert towards the programming position.

These and other features, objects and advantages of the present invention will more clearly appear from the following description of some embodiments, being not limiting examples, with reference to the accompanying drawings, wherein.

Figure 9A:
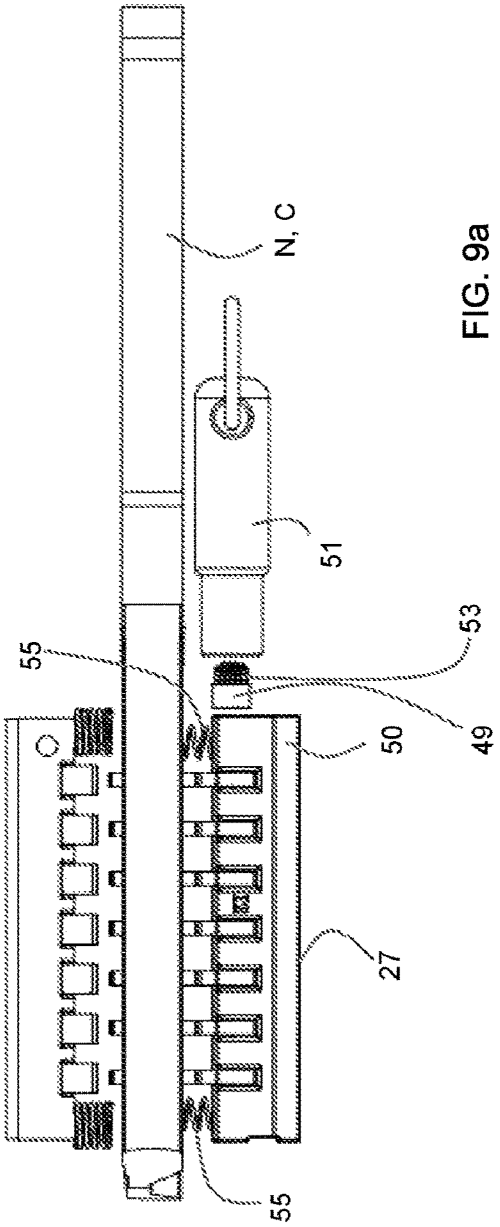
Figure 9B:
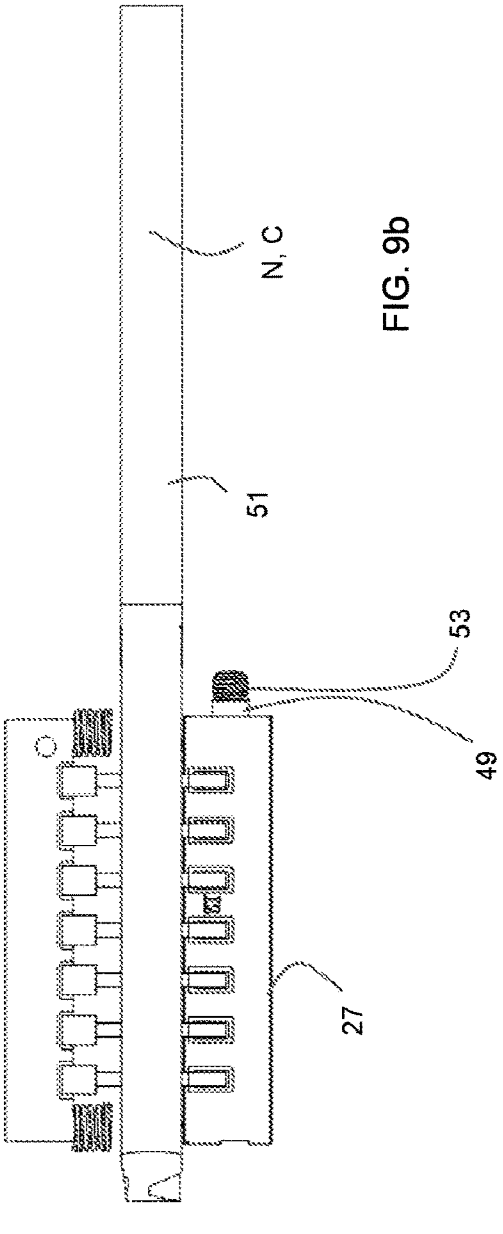

FIGS. 9*a* and 9*b* show, with numerous elements removed for clarity, a top view of the lock with the key inserted in the rotor and in a reprogramming position (a) or locking position of the reprogramming function (b).

With reference to FIGS. 1 to 5, a lock of the kind to which the invention is applied includes, in an embodiment, a stator 1 having a cylindrical bore 2 for a rotor 9; along bore 2 extends, at least in correspondence of the programming device, a longitudinal side groove 3. In the represented embodiment, stator 1 has a recess 4 for receiving a ring 5 with a web 6 forming a part of the operative member of the lock, but in other embodiments this web 6 can be replaced by different members, for example by cams. Stator 1 also has vertical channels 7 and 8 intended to house counter-pins 31 of the lock.

Rotor 9 is cylindrical and it has a keyhole 10 for inserting an initial key C. Rotor 9 is installed inside bore 2 of stator 1. Rotor 9 includes a series of first seats 12 intersecting keyhole 10 for the key C, and it includes a series of second seats 13, parallel to first seats 12, a first slot 14 and a second slot 15, orthogonal with respect to said seats and parallel to the rotor axis. For each unit of the programming mechanism, a key follower 16 is inserted with longitudinal and transversal mobility in one of said first rotor seats 12 for cooperating with the conformations of key C inserted in said keyhole 10. The key follower 16 is provided on one side with projections 17 and on the opposite side with an element 18 for sliding engagement, and it is associated with a spring 19 which stresses the key follower towards the keyhole 10. A locking pin 20 is slidingly inserted in one of said second rotor seats 13, and it is provided with a series of first recesses 21 facing said projections 17 of key follower 16, and with a series of second recesses 22 facing the side opposite said key follower 16. A stop bar 23 is inserted in said first rotor slot 14, and it has projections 24 facing said second recesses 22 of the locking pins 20, and a projection 25 facing the side opposite said locking pins and suitable for cooperating with said stator groove 3. Stop bar 23 is associated with first springs 26 which stress the stop bar outwards. A change bar or programming insert is inserted in said second orthogonal rotor slot 15, and it is provided with slidable engagement elements 28 engaged with said sliding engagement elements 18 of key followers 16, and with a projection facing the side opposite key followers 16 and suitable for cooperating with said stator groove 3. It is to be remarked that change bar 27, in the known embodiments, is associated with one or more springs biasing the change bar outwards. Such springs, or at least a part of them, may be omitted in certain embodiments of the present invention. A counter-pin 31 is inserted in the stator channel 8 for cooperating with the locking pin 20. The counter-pin 31 is pushed by a spring 32 which, by means of a little block 33, rests against a retainment bar 34 inserted in a corresponding stator hole. Such counter-pins 31 may be foreseen in order to give more strength to the lock, however they are not necessary and may be omitted.

The operation of the described mechanism is as follows: In the absence of a key (FIG. 2), the locking pins 20 and possible counter-pins 31 pass through the coupling surface between stator 1 and rotor 9, and they prevent the rotor rotation. The locking pins 20 are rendered solid with the key followers 16 by the mutually engaged toothings 17 and 21. Under action of springs 26, stop bar 23 is inserted with its projection 23 in stator groove 25, and therefore toothings 22 and 24 are mutually disengaged and the displacement of locking pins 20 along with the key followers 16 is free when a key is inserted or extracted. When the correct key is inserted (FIG. 3), the end portions of the locking pins 20

(and possible counter-pins 31) are brought to correspond to the coupling surface between stator 1 and rotor 9, whereby rotor 9 can be rotated by 360° in order to operate the lock. When effected this rotation, all elements take again their initial positions, and the key can be extracted.

Figure 1:
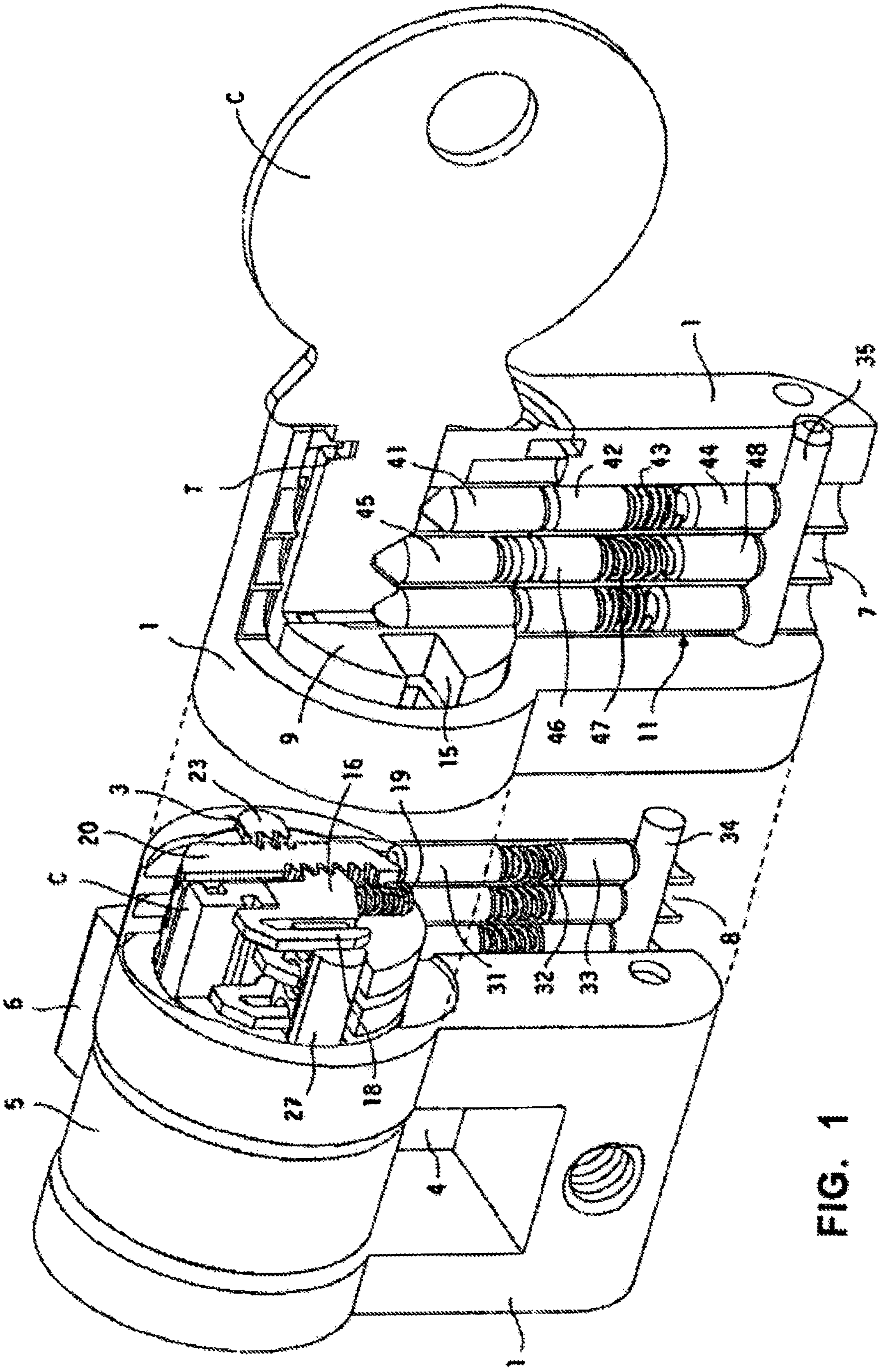
FIG. 1 represents in axonometric perspective a lock embodiment, partially interrupted and having some outer parts sectioned in order to show some inner parts.
Figure 4:
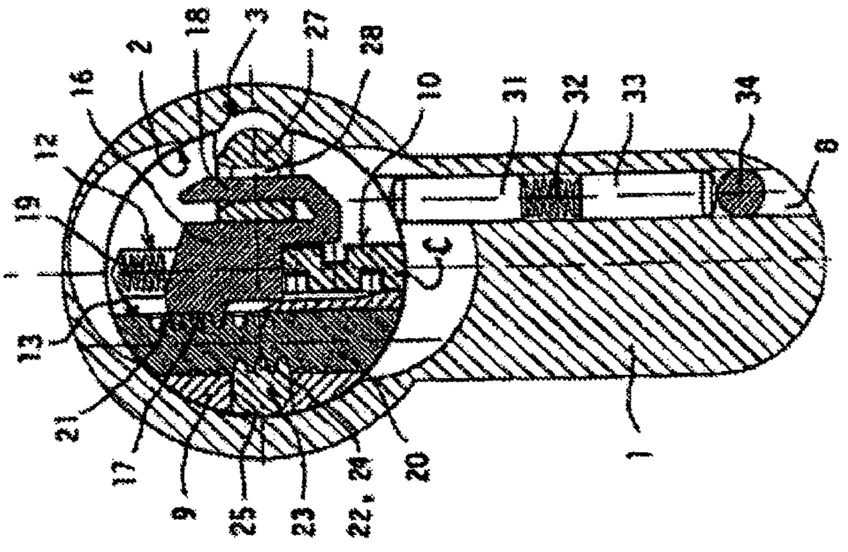
FIG. 4 shows a cross section corresponding to those of FIGS. 2 and 3, and represents the lock as it appears when the key has been rotated into the change position.
Figure 3:
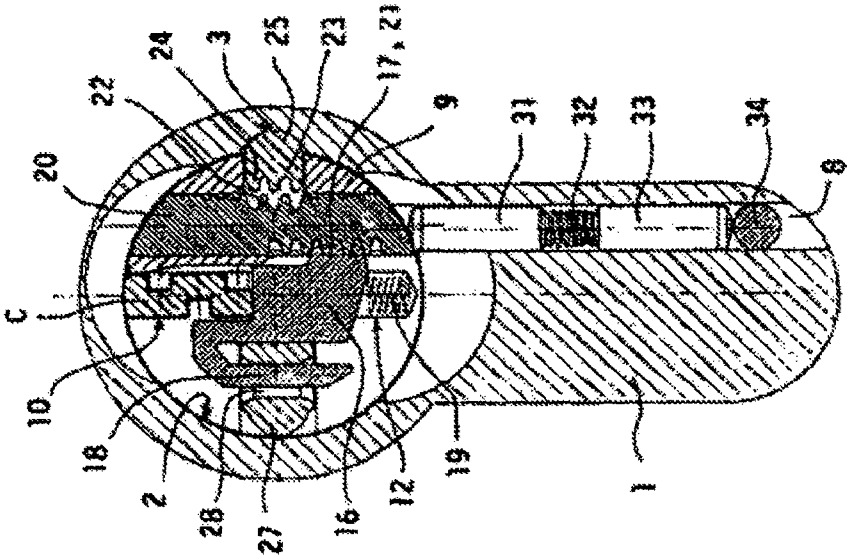
FIG. 3 shows a cross section corresponding to FIG. 2, and shows the lock as it appears when the correct key has been inserted into the lock.
Figure 2:
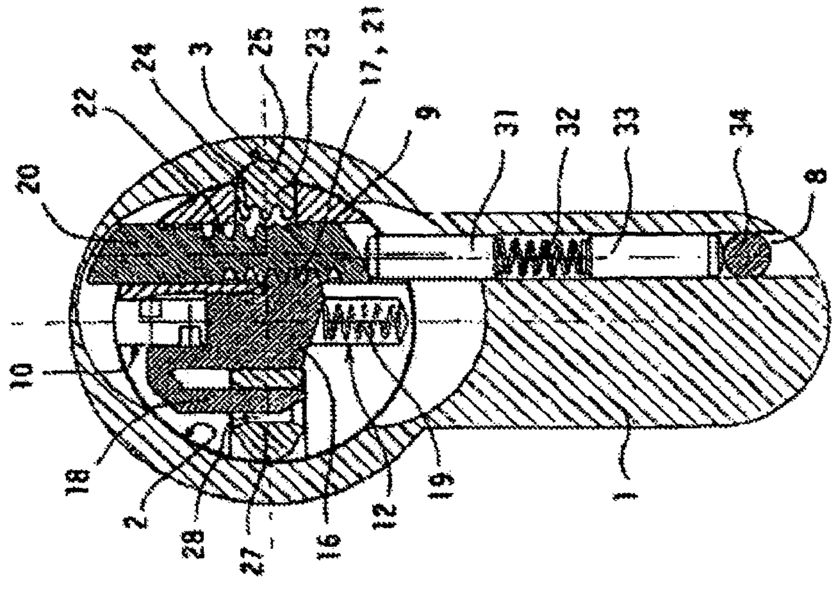
FIG. 2 shows a cross section of the lock as it appears in the absence of a key inserted into the lock.
Figure 5:
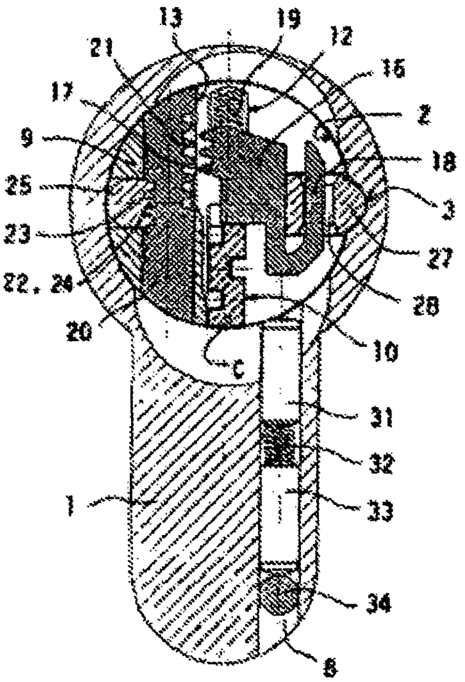
FIG. 5 shows a cross section corresponding to those of FIGS. 2, 3 and 4, and represents the lock as it appears when the change bar has been displaced outwards for allowing changing the key.

When, on the contrary, rotor 9 is rotated by 180° into a change angular position (FIG. 4), change bar 27 is with its projection corresponding to the stator groove 3. However, in the at least partial absence of springs biasing change bar 27, this latter is not completely displaced outwards and at least some toothings 17 of key followers 16 remain engaged with the teeth 21 of the locking pins 20, which are blocked in their position by stop bar 23 which, no more corresponding to the groove 3, maintains mutually engaged toothings 22 and 24. Therefore, in this position it is not possible to unintentionally extract key C and lose the lock programming. If, on the contrary, the user who is willing to program in a different manner the lock effects from outside a maneuver which brings change bar 27 to displace outwards by entering its projection into stator groove 3, as shown by FIG. 5, elements 18 and 28 of sliding engagement, mutually engaged, displace in transversal direction key followers 16 by mutually disengaging toothings 17 and 21, whereas stop bar still blocks locking pins 20 in their positions. Therefore, in this position it is possible to extract the key, and then all key followers 16 are pushed by springs 19 at the end of their strokes, and the lock loses its former programming.

By then inserting a new key, the key followers take a programming position corresponding to this new key. By rotating again rotor 2 by 180°, the lock takes again its initial position according to FIG. 3, but now it is programmed according to the codification of the new key. In addition to the described programming mechanisms, the lock may include mechanisms with locking pins and counter-pins of conventional type, which in the example are represented by locking pins 41 inserted into bores 1 of rotor 9, by counter-pins 42, springs 43 and rest blocks 44 inserted in channels 7 of stator 1 and kept in place by retainment bars 35. These per se well known mechanisms can be adopted with advantage in addition to the programming mechanisms, but a lock according to the invention can well be realized without making use of mechanisms of this type.

Similarly, if desired, in the lock according to the invention may be included the mechanisms characteristic of the locks with master keys, wherein the locking pins 45 are divided in two or more sections in their regions near the surface separating them from the counter-pins 46.

Figures from 6 to 9 show a particular embodiment of the change means intended to push outwards change bar 27 when the user, after having brought the key C in the change position, intends to provide a new programming of the lock.

Figure 6:
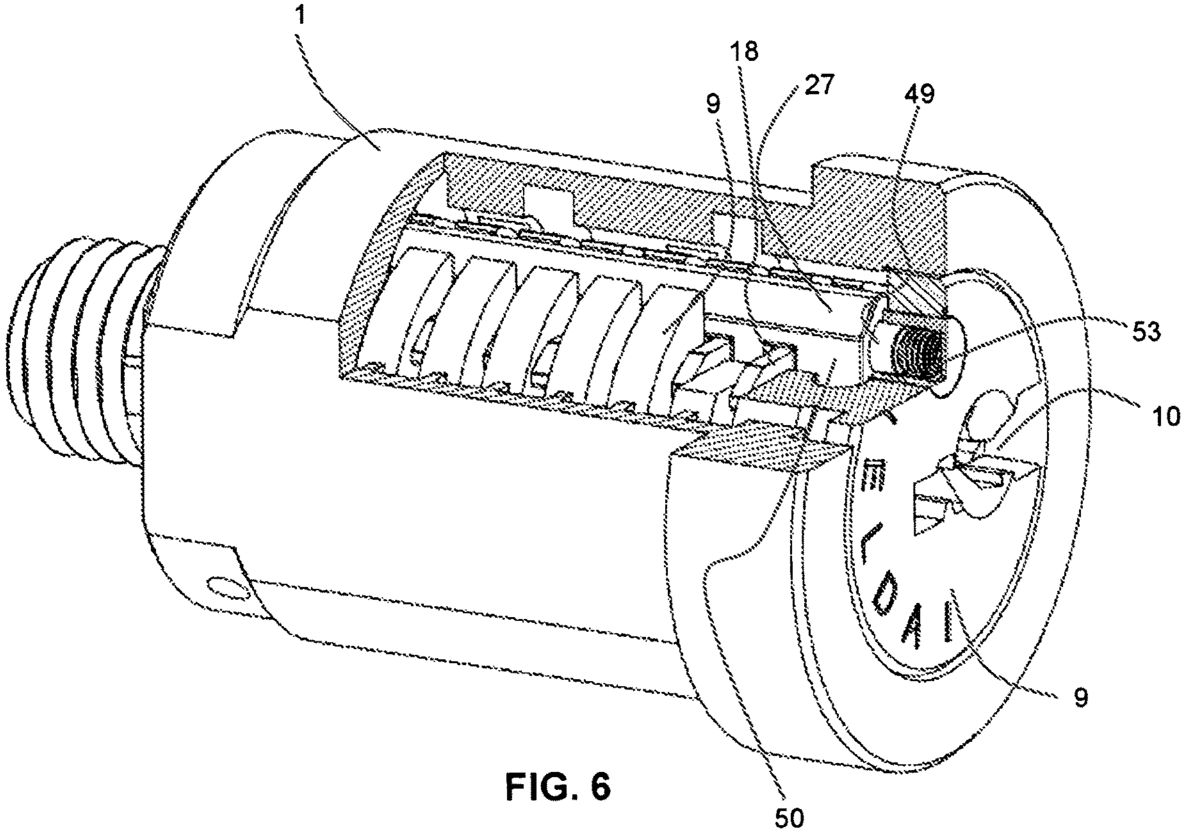
FIG. 6 shows in a perspective view the lock with some elements partially sectioned and the relative key not yet inserted into the lock.
Figure 7:
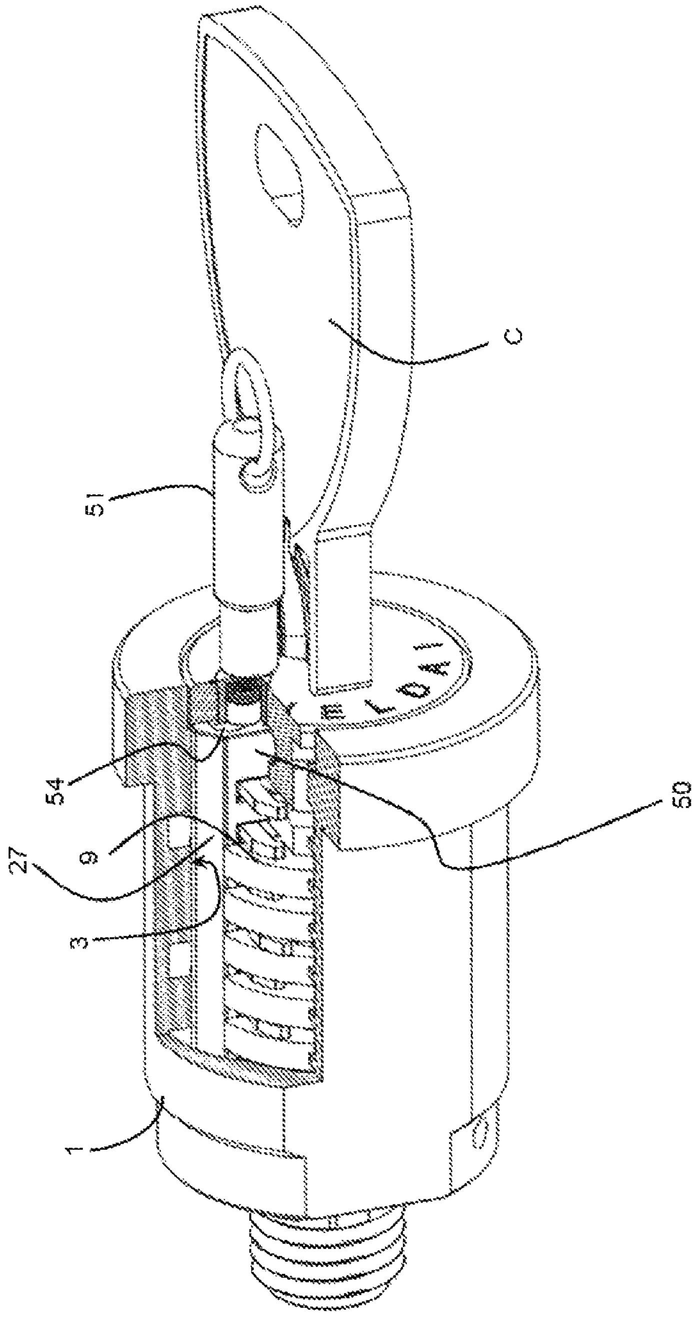
FIG. 7 shows the lock similarly to FIG. 6, with some elements partially sectioned to show internal parts, with an initial key introduced into the lock and illustrates a change magnet approached to the rotor.

FIG. 6 shows in a perspective view the lock with the correspondent key C not yet inserted into the lock. As can be seen, rotor 9 carries an insert 49 movable between an extracted position wherein an end portion 50 of change bar 27 is engaged (FIG. 6) and a retracted position wherein change bar 27 and insert 49 are disengaged (FIG. 7). When change bar 27 is engaged, at least one or more pairs of key followers and pins 16, 20 are coupled e.g. radially coupled, in particular at least the pair of key follower and pin proximal to keyhole 10 is coupled so as to block the movement of the correspondent key follower and keep key C locked in rotor 9.

FIG. 7 shows a condition similar to that of FIG. 5 i.e. in the angular change position by means of initial key C, change bar 27 is pushed into groove 3 of the stator by the one or more springs after insert 49, which comprises a magnetic material, is brought into the retracted position by means of a magnet 51, thus disengaging end portion 50. Now all key followers 16 and pins 20 are decoupled and it is possible to remove initial key C to reprogram the lock. Once a new key N with a relative mapping different from the one of the initial key C has been inserted, key followers 16 are still free to move and are arranged along the new mapping thanks to the action of springs 19.

Figure 8:
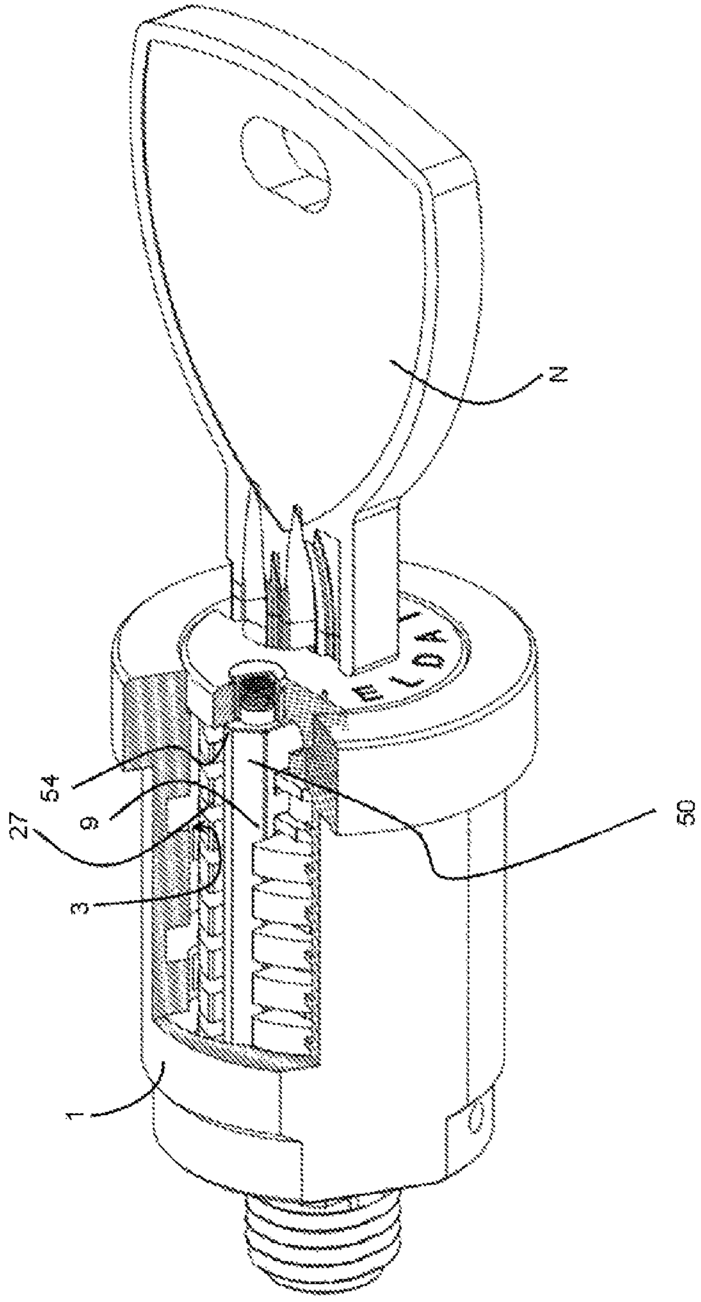
FIG. 8 shows similarly to FIGS. 6 and 7 the lock, with a new key introduced into the lock, during the rotation to bring the rotor back to the initial position of use.

Subsequently (FIG. 8) the user rotates new key N to return rotor 9 to the starting position and, in this way, a back of change bar 27 follows a progressive shaped profile of groove 3 of the stator, opposes the action of the one or more radial springs applied to change bar 27 and controls the translation of the same towards the axis of rotation of rotor 9. When change bar 27 has completely come out of groove 3 of the stator, the radial position of change bar 27 is such as to firmly engage all key followers 16 in the corresponding pins 20 so as to mechanically memorize the new mapping of new key N.

Preferably, when change bar 27 following the rotation of the rotor 9 is completely out of groove 3, end portion 50 and insert 49 are again aligned and it is possible to restore the coupling e.g. shape coupling, between insert 49 and change bar 27.

According to the embodiment illustrated in the figures, insert 49 is kept in the extracted position by means of a spring 53. According to this embodiment, when end portion 50 reaches the radial position such as to engage at least the pair of key follower and pin proximal to keyhole 10, spring 53 automatically pushes insert 49 inside a suitable cavity 54 of change bar 27. As shown in the figures, the direction of movement of insert 49 is transverse to that of the change bar 27, in particular the first is substantially axial, the second substantially radial.

According to a not shown embodiment, change bar 27 carries a permanent magnet which attracts insert 49 in the extracted position when change bar 27 is completely out of groove 3 of the stator. In this case, the magnetic field of magnet 51 must be more intense than that of change bar 27 in order to retract insert 49 when necessary.

FIG. 9 shows the angular position of the change and the action of radial springs 55 pushing change bar 27 into the groove 3.

It should be understood that this invention is not limited to the embodiment described and shown. as an example. Several possible modifications have been pointed out in the course of the description, and others are within the ability of those skilled in the art. These modification and others, and any replacement by technically equivalent means, can be made to what has been described and shown, without departing from the spirit of the invention and the scope of this Patent as defined by the appended Claims.

The invention claimed is:

1. A reprogrammable cylinder lock, comprising:

a stator;

a rotor rotating in the stator and having a keyhole for insertion of a key;

a first plurality of key followers movable in corresponding seats intersecting the keyhole so as to adapt to a key mapping;

a second plurality of toothed pins carried by the rotor and movable between a retracted position in which the rotor rotates inside the stator and an extracted position in which rotation of the rotor is prevented to open the lock;

wherein the key followers and the toothed pins are movable between a disengaged position in which the key followers are free to move linearly in the seats with respect to the toothed pins to adapt to different mappings and an engaged position in which the toothed pins and the key followers are coupled to move together along the seats, said disengaged position being obtained in a reprogramming configuration of the lock;

a programming insert connected to said key followers and movable in a reprogramming position to disengage the key followers from the toothed pins in said reprogramming configuration; and a tool to bring the programming insert to the reprogramming position;

wherein the lock further comprises a stop movable between an advanced position in which the programming insert is locked so that the key followers and the toothed pins are engaged, and a retracted position in which the programming insert is pushed elastically into the reprogramming position, and wherein the stop comprises a magnetic material and the tool is also magnetic and of such polarity as to bring the stop into the retracted position when approached to the rotor.

2. The reprogrammable cylinder lock according to claim 1, wherein the stop is held in the advanced position by a first spring and the action of the tool contrasts that of the spring when the stop is brought into the retracted position by the tool.

3. The reprogrammable cylinder lock according to claim 2, wherein said spring is configured to push the stop into the advanced position when the programming insert reaches a position in which the key followers and the toothed pins are coupled.

4. The reprogrammable cylinder lock according to claim 1, wherein an end portion of the programming insert defines a cavity adjacent to the keyhole;

wherein the programming insert is movable in a radial direction to reach said reprogramming position; and wherein the stop is angularly rigid and axially movable by the rotor so as to disengage from the cavity in the retracted position to free the programming insert and provide radial displacement so as to disengage each key follower from each toothed pin.

5. The reprogrammable cylinder lock according to claim 1, further comprising a spring configured to be compressed when the reprogramming insert is in an engagement position between the key followers and the toothed pins and the lock operates to open or close with the key; and wherein the spring is configured to push the programming insert into said programming position when the stop is in said retracted position.

6. The reprogrammable cylinder lock according to claim 1, wherein the stator defines a groove, and with the groove housing the programming insert in said reprogramming position.

7. The reprogrammable cylinder lock according to claim 6, wherein the groove has at least one inclined side so that when the rotor is rotated by the key, the programming insert is returned to an engagement position such that the key followers and the toothed pins are coupled.

* * * * *